May 3, 1927.
P. SCHAURTE
ROTARY MACHINE
Filed Jan. 19, 1926    2 Sheets-Sheet 1
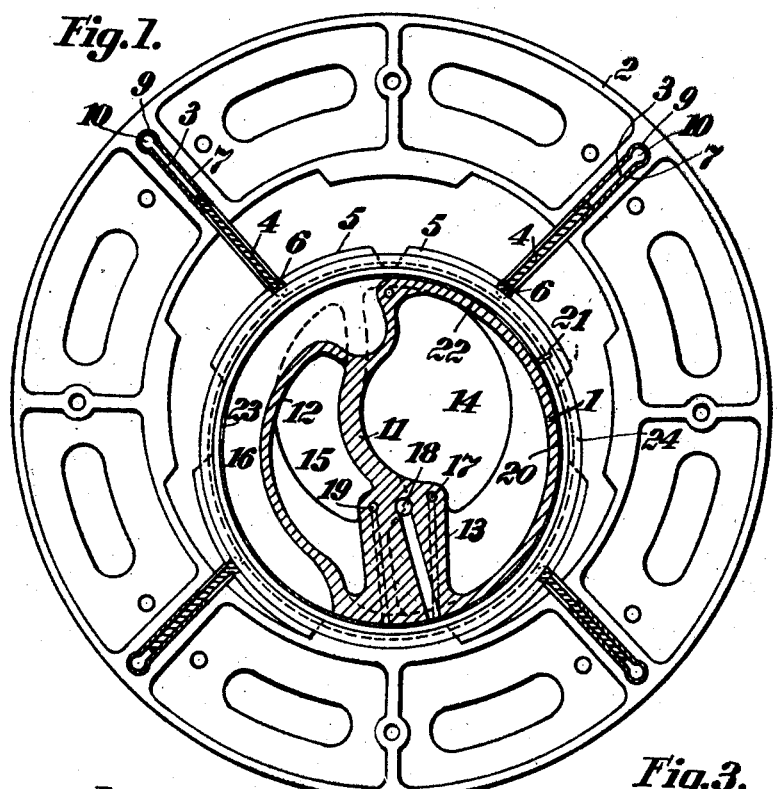
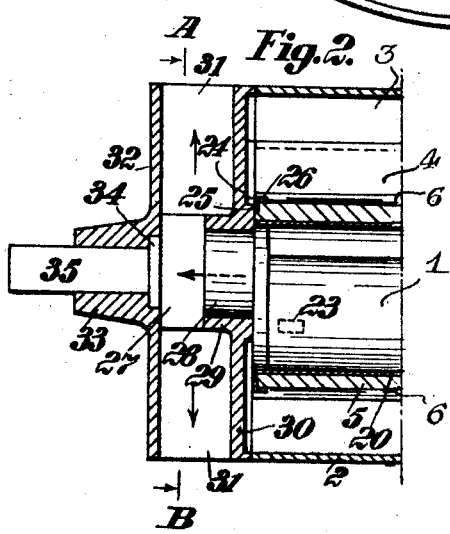
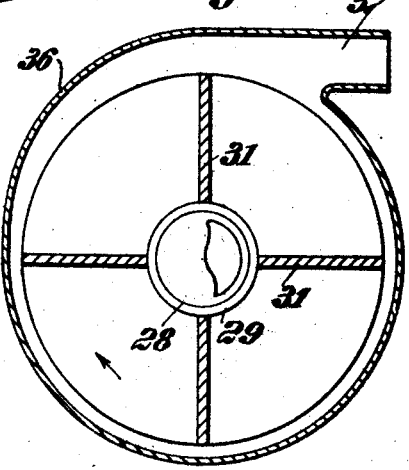
Paul Schaurte, Inventor
by his attorneys May 3, 1927.
P. SCHAURTE
1,626,973
ROTARY MACHINE
Filed Jan. 19, 1926  2 Sheets-Sheet 2
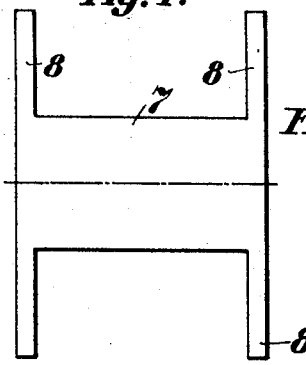
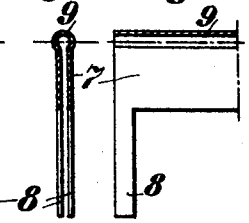
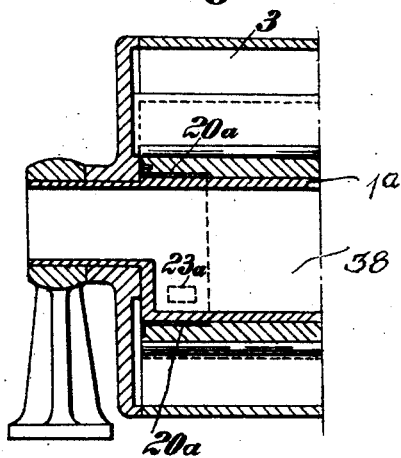
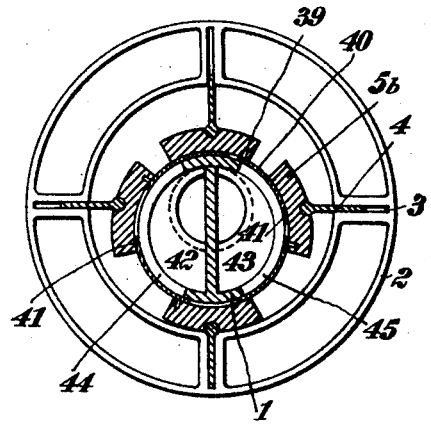

Patented May 3, 1927.

1,626,973

UNITED STATES PATENT OFFICE.

PAUL SCHAURTE, OF ZURICH-ALTSTETTEN, SWITZERLAND.

ROTARY MACHINE.

Application filed January 19, 1926, Serial No. 82,188, and in Germany September 10, 1924.

This invention relates to improvements in rotary machines, i. e. in machines of that type in which a liquid or gaseous fluid is drawn or forced into and expelled from expanding and contracting chambers within a casing, said chambers being formed by means of vanes or slides movably arranged in or on the wall of the casing, the other end of said vanes or slides being kept in contact with a drum or piston or hinged to sliding shoes sliding on this drum or piston. Such apparatus or machines may be used for instance as rotary pumps, pressure blowers, gas exhausters or rotary engines. The invention relates especially to improvements in rotary machines or apparatus of this type in which the piston is stationary whereas the casing is rotating and in which the sliding shoes or elements connected therewith are constructed as distributing valves for the admission and delivery of the gaseous or liquid fluid supplied from the centre through the hollow piston.

According to the invention a plate of sheet metal is arranged between the sliding shoes and the outer surface of the hollow piston around said piston and having outlet slots or the like, said plate being rigidly connected with one of the sliding shoes. This plate directly controls the distribution of the fluid and renders it possible that the sliding shoes be made of another material as the hollow piston. The sliding shoes may, for instance, be made from aluminium, there being no danger of rapid and strong wear of the shoes as would be the case if the aluminium shoes slide directly upon the piston.

A further object of the invention is to ensure a concentric holding together of the sliding shoes. With this object in view a ring rotatable with regard to the sliding shoes is inserted in grooves in each of the end faces of the shoes. Preferably the ring also engages with grooves in the thickened joints of the slides which are in contact with the sliding shoes.

The invention has further for its object to make the admission chamber for the fluid in the piston much larger than the delivery chamber. This is very important if the rotary machine has to be used as pressure pump. In this case the suction chamber of the hollow piston is considerably larger than the pressure chamber and consequently the speeds of flow on the suction side and on the pressure side do not exceed the admissible limits. In this manner the efficiency of the engine is increased. The partition in the hollow piston which separates the suction chamber from the pressure chamber is curved arch-like whereby a great resisting capability against the pressure acting upon the same is obtained.

Still another object of the invention is to provide in the piston of the rotary machine more than two separate hollow spaces or chambers, this being important for certain purposes. It will be possible, for instance, to effect the mixing of two or more liquids or gases or liquids and gases in the rotary machine, and the common conveying or working up of the same by the machine. The several hollow spaces or chambers in the piston may be of different sizes so that the quantity of the substances drawn in simultaneously or successively may be different or regulated at will. Separate hollow spaces or chambers for the cooling of the piston or of the contents of the other hollow spaces or chambers in the piston from the interior may be provided.

In order to obtain a perfect packing between the stationary piston and the rotating casing, it is further important, according to the invention, to line the guide slots for the slides in the casing with sheet metal which has been conveniently bent, preferably drawn. As at the drawing any desired thickness and shape can be given to the sheet metal it is possible to obtain a perfect packing between the slide and the casing, this being otherwise connected with great difficulties.

It is further of importance for the invention to take care that if the rotary machine is to be used as power engine a central power supply can take place in a simple manner. With this object in view the fluid which has been utilized is made to flow out at the circumference of the rotating casing so that on one end of the casing a short shaft can be arranged designed for the power transmission. The casing may preferably be at this portion of such construction that the outflowing fluid is accelerated by centrifigual force which is obtained by means of blades arranged on this portion of the rotating casing, said blades having an exhausting effect upon a gaseous fluid.

Several embodiments of the invention are illustrated, by way of example, in the accompanying drawing in which:—

Fig. 1 is a cross section through an improved rotary machine embodying my invention; Fig. 2 is a longitudinal section through the one end of this machine, on a reduced scale; Fig. 3 is a cross section on line A—B of Fig. 2. Figs. 4 to 6 show different views of the sheet metal plate serving as lining for the bearings of the slides in the casing; Fig. 4 showing the blank of sheet metal obtained by stamping, Fig. 5 a cross section showing the sheet metal plate bent and Fig. 6 in longitudinal section one half of the sheet metal plate as shown in Fig. 5. Fig. 7 shows in longitudinal section one of the ends of a rotary machine of modified construction embodying my invention, and Fig. 8 shows in cross section a form of construction according to Fig. 7 but modified in a certain manner.

Referring to Figs. 1 to 6 the stationary hollow piston 1 is surrounded by the rotary casing 2 eccentrically mounted with regard to said piston. Slides 4 arranged in slots 3 of casing 2 are hingedly connected with sliding shoes 5 by their inner ends 6 enlarged like cylinders or rolls engaging corresponding sockets of said shoes. The slots 3 are lined with bent and preferably drawn plates 7 of sheet metal, not shown in Fig. 2 for sake of clearness. The blanks of the plates 7 have the shape shown in Fig. 4, i. e. they have strips or flaps 8 at the ends of the upper and lower edges, the corresponding strips at each end of the plate registering or being placed the one upon the other if the plate 7 is bent over at the middle (see Fig. 5). The strips 8 of the plate 7 engage with guide grooves in the side walls of the casing which are not shown in the drawing and in which the edges of the slides 4 are guided. In this manner a perfect packing between the casing 2 and the slides 4 is obtained at these points also.

Each sheet metal plate 7 is bent at 9 (Figs. 5 and 6) to form an eye. The ends of the guide slots 3 situated in the interior of the casing 2 have corresponding eye-shaped enlargements 10 into which fit the eyes 9 of the sheet metal plates 7. The sheet metal plates 7 after being bent together are inserted into the slots 3 prior to the fixing of the covers of the casing, so that the plates 7 will be well secured in position by said covers.

Instead of bending the guiding and lining plates 7 for the slides 4 subsequently they might be drawn in the bent state, the strips 8 being then subsequently produced by cutting, stamping or the like.

The hollow space of the piston 1 is subdivided by axial partitions 11 and 12 into several compartments 14, 15 and 16, and in a thickened portion 13 of these partitions special channels 17, 18 and 19 are arranged. All these compartments and channels or hollow spaces are separated from one another by axially extending walls. The partition 11 is, as can be seen from Fig. 1, curved in arc shape so that it possesses great resistance to the pressure acting upon it. If the rotary machine is to be used as pressure pump the hollow space 14 of the largest cross section serves as suction chamber, that 15 of smaller cross section serving as pressure chamber. Owing to the different sizes of the suction chamber and of the pressure chamber the speed of flow on the suction side and on the pressure side can be regulated in accordance with the pressure conditions.

The hollow spaces 14 and 15 might, if the rotary machine is to be utilized for any other purpose, serve for cooling the piston, the cooling fluid, for instance water, flowing into the hollow space 15 at the one end, to pass over at the other end of space 15 through a passage not shown, into the other hollow space 14 and out of the piston at the entrance end. The hollow spaces 17 and 18 would in this case serve, for instance, for the admission of a gas or several gases, and the hollow space 19 for the admission of a liquid as for instance oil, 16 being the outlet space for the fluid. If the rotary machine is to be used as internal combustion engine the hollow spaces 17 and 18 may serve for the admission of the air and of the liquid fuel, and the hollow space 19 for the admission of the lubricating oil, 16 serving again as exhaust compartment for the explosive mixture.

The arrangement and distribution of the partitions between the several hollow spaces or chambers and consequently the arrangement of these chambers in the piston 1 may be different from that described and any other number of partitions and hollow spaces might be used.

Between the sliding shoes 5 and the outer surface of the hollow piston a piece of flexible sheet metal 20 is arranged which at 21 is rigidly connected with one of the sliding shoes 5. This piece of sheet metal 20 passes freely underneath all the sliding shoes 5. The end 22 of the piece 20 of sheet metal which is not fixed projects underneath the same sliding shoe 5 to which the other end of this piece of sheet metal is fixed at 21. The piece of sheet metal 20 has slots or apertures 23 which register with corresponding slots or apertures in the wall of the piston and serve for the distribution of the fluid. They are alternately covered and liberated by the sliding shoes 5.

The second end 22 of the piece of sheet metal 20 might be attached to the same sliding shoe on which the front end is fixed at 21 the one of the two attachments being yieldable in this case in order to permit of expansion of the sheet metal body under the action of heat.

To ensure the concentric holding together of the sliding shoes 5 at the rotation of the casing 2 a ring 24, common to all sliding shoes, is inserted into grooves or indentations in each end face of the sliding shoes 5, said sliding shoes being capable of displacing themselves with regard to one another and to said ring 24 by shifting on said ring. This ring 24 is of angular cross section as shown in Fig. 2 and comprises the branches 25 and 26. One portion of the ring 24, the main part of branch 25, engages with indentations or grooves in the end faces of the sliding shoes 5 and the other branch 25 engages with indentations or grooves of the cylindrical parts or joints 6 of the slides 4. In this manner excessive weakening of the sliding shoes 5 on the end faces is avoided.

The arrangement might be inverse, the horizontal arm 26 of ring 24 engaging with the end faces of the sliding shoes 5, the vertical arm 25 of the same extending into the joints 6 of the slides 4. By the angular cross section of ring 24 the advantage is obtained that the ring will be better suited to withstand tensile stresses at the centrifugal action of the sliding shoes.

If the rotary machine is to be used as a driving engine and the one of the two hollow spaces 14 and 15 of the piston serves for the admission and the other for the exhaust of the gaseous or liquid driving fluid, the driving fluid which has been utilized may be conducted from the exhaust chamber, for instance 15, into a central chamber 27 (Fig. 2) at the one end face of the piston in the direction of the arrow. In order to obtain this central chamber the tapered end 28 of piston 1 is mounted in a sleeve 29 on the end wall 30 of the casing 2. This end wall 30 carries vanes 31 which may be straight or curved and serve for rigidly connecting the end wall 30 with the outer end wall 32 in, the hub 33 of which a central shaft 35 is mounted which has a collar 34. The vanes 31 have an exhauster-like action so that the fluid which passes out from the one chamber of the hollow piston 1 into the central chamber 27 in the direction of the horizontal arrow (Fig. 2) is thrown out of the chamber 27 in the direction of the vertical arrows by the centrifugal action. The effect is the same as in an exhauster similar to which the spiral shaped outer wall or cover 36 (Fig. 3) with outlet port 37 might be constructed.

Instead of being connected by vanes shaft 35 and end wall 32 might be connected with wall 30 of the casing 2 in any other manner, for instance by a crown having outflow apertures or by ribs or cross bolts. In this case there would however not be produced the exhauster-effect for the outflowing fluid.

The flexible piece of sheet metal 20 arranged between the stationary piston 1 and the sliding shoes 5 need not extend over the entire length of piston 1 but only over a portion of this length as shown in Fig. 7 so that, for instance, only the one hollow space in the piston or only a portion of the hollow spaces in the piston is controlled by the piece of sheet metal, the remaining portion being controlled, in the usual manner, directly by the sliding shoes 5 registering with the apertures of the piston envelope. If the intermediate sheet metal piece extends, as mentioned, only over a portion of the length of the piston the control-periods for the several hollow spaces in the piston might be selected at will and be quite close together.

An arrangement of this type is illustrated in Fig. 7 in which the flexible piece of sheet metal 20$^a$ extends only over a portion of the length of the piston 1$^a$ and controls only a portion of the compartments of this piston. Apertures 23$^a$ are arranged in the piece of sheet metal 20$^a$ for the control of the corresponding compartment. The other compartments of piston 1$^a$, for instance the hollow space 38, are directly controlled by the edges of the sliding shoes 5 which are directly in contact with the portion of the surface of the piston 1$^a$ which is not covered by the piece of sheet metal 20$^a$ (Fig. 7).

Instead of one single piece of sheet metal 20 or 20$^a$ extending underneath all the sliding shoes 5, each sliding shoe may be connected with a separate piece of sheet metal extending to underneath the next following sliding shoe in the case which has been just described as well as in the form of construction shown in Figs. 1 and 2. A construction of this type is shown in cross section in Fig. 8. The use of such separate pieces of sheet metal facilitates the assembling of the parts.

In this last mentioned form of construction the one end of pieces 40 of sheet metal bent in sector shape is fixed on the inner surface of one of each sliding shoe 5$^b$ at 39, said pieces 40 being of such dimensions that their other free ends 41 extend underneath the next following sliding shoe 5$^b$ even if the same is distant from the preceding sliding shoe as far as possible. These pieces 40 of sheet metal have ports, not visible in the drawing, or slots for the distribution of the fluid which flows in or out through the slots 44 or 45 of the piston wall into or out of the chambers 42 or 43. The arrangement of these control pieces may be either so that they extend from the sliding shoe to which they are fixed to underneath the sliding shoe which precedes in the direction of rotation or to underneath the sliding shoe which follows next in the direction of rotation.

Having now particularly described and ascertained the nature of my said invention, I declare that what I claim is:—

1. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston.

2. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, said flexible sheet metal plate encircling nearly the whole circumference of said piston, one end of said sheet metal plate being fixed to one of said sliding shoes, the other end of said plate freely entering between the other end of the same said sliding shoe to which the first end of said sheet metal plate is fixed and said piston.

3. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, the sheet metal plate only covering a part of the axial length of said piston and only controlling part of the compartments of said piston.

4. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, a ring engaging the end faces of all said sliding shoes, said ring being rotatable with regard to said sliding shoes.

5. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, a ring engaging the end faces of all said sliding shoes, said ring being rotatable with regard to said sliding shoes, said ring also engaging the joints of said vanes.

6. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, a ring engaging the end faces of all said sliding shoes, said ring being rotatable with regard to said sliding shoes, said ring also engaging the joints of said vanes, and said ring having angular cross-section, one branch of the angle engaging said joints of said vanes.

7. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, bent sheet metal linings for said guide slots within said casing.

8. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, bent sheet metal linings for said guide slots within said casing, said sheet metal linings having strips at their edges.

9. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, bent sheet metal linings for said guide slots within said casing, said guide slots of said casing being enlarged at their outer ends, said sheet metal linings being bent in such a manner that corresponding enlargements are formed at the bending spot thereof.

10. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, more than one axial partition in said hollow piston, the thus formed chambers within said piston being employed for different purposes.

11. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, the axial compartments of said hollow piston being of different size.

12. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, the axial compartments of said hollow piston being of different size, the axial partition separating said axial compartments from one another being curved arch-like.

13. A rotary engine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, the inlet and outlet of the power fluid taking place through said axial compartments of said hollow piston at the front faces of said piston, a chamber in the end wall of said rotating casing, said chamber communicating with the outlet compartment of said hollow piston, an outlet opening for said chamber of said rotating casing at the circumference of said casing.

14. A rotary engine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, the inlet and outlet of the power fluid taking place through said axial compartments of said hollow piston at the front faces of said piston, a chamber in the end wall of said rotating casing, said chamber communicating with the outlet compartment of said hollow piston, an outlet opening for said chamber of said rotating casing at the circumference of said casing, a short central shaft through the end wall of said casing which is adjacent to said chamber.

15. A rotary engine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, the inlet and outlet of the power fluid taking place through said axial compartments of said hollow piston at the front faces of said piston, a chamber in the end wall of said rotating casing, said chamber communicating with the outlet compartment of said hollow piston, an outlet opening for said chamber of said rotating casing at the circumference of said casing, and blades arranged within said chamber.

16. A rotary engine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, the inlet and outlet of the power fluid taking place through said axial compartments of said hollow piston at the front faces of said piston, a chamber in the end wall of said rotating casing, said chamber communicating with the outlet compartment of said hollow piston, an outlet opening for said chamber of said rotating casing at the circumference of said casing, a short central shaft through the end wall of said casing which is adjacent to said chamber, said stationary piston having a tapered end, said tapered end being mounted in a sleeve of said casing, said chamber being arranged between said sleeve and said central shaft of said casing.

17. A rotary machine comprising a rotating casing and a stationary hollow piston with at least two axial compartments, a flexible sheet metal plate on the circumference of the outer face of said stationary piston, sliding shoes on the outer surface of said sheet metal plate, vanes pivotally connecting said rotating casing with said sliding shoes, guide slots for said vanes within said casing, openings in said sheet metal plate for distributing the inlet and outlet of the fluid employed in and out of said compartments of said piston, said flexible sheet metal plate encircling nearly the whole circumference of said piston, one end of said sheet metal plate being fixed to one of said sliding shoes, the other end of said plate freely entering between the same of said sliding shoes and said piston, a ring engaging the end faces of all said sliding shoes, said ring being rotatable with regard to said sliding shoes, said ring also engaging the joints of said vanes, and said ring having angular cross-section, one branch of the angle engaging said joints of said vanes, bent sheet metal linings for said guide slots within said casing, more than one axial partition in said hollow piston, the thus formed chambers within said piston being employed for different purposes, the axial compartments of said hollow piston being of different size, the axial partition separating said axial compartments from one another being curved arch-like, the inlet and outlet of the power fluid taking place through said axial compartments of said hollow piston at the front faces of said piston, a chamber in the end wall of said rotating casing, said chamber communicating with the outlet compartment of said hollow piston, an outlet opening for said chamber of said rotating casing at the circumference of said casing, a short central shaft through the end wall of said casing which is adjacent to said chamber, and blades arranged within said chamber.

In testimony whereof I have hereunto set my hand.

PAUL SCHAURTE.